March 18, 1952     J. R. WEINER     2,589,465
MONITORING SYSTEM
Filed Oct. 22, 1949

INVENTOR.
James Robert Weiner

Patented Mar. 18, 1952

2,589,465

UNITED STATES PATENT OFFICE 2,589,465

MONITORING SYSTEM

James Robert Weiner, Philadelphia, Pa., assignor to Eckert-Mauchly Computer Corporation, Philadelphia, Pa., a corporation of Pennsylvania Application October 22, 1949, Serial No. 122,881

8 Claims. (Cl. 177—311)

1

This invention relates to electrical test apparatus, and more particularly to a novel monitoring system for indicating the intermittent absence of pulses.

Pulses of electric energy are employed for numerous purposes, one of which is for effecting operation of some device in a manner determined by the number and spacing of pulses in a group or sequence of pulses, as in the case of electronic computing systems, radio controlled apparatus, and the like. For such applications the pulse systems are often of the type which, in response to an exciting or primary pulse, provides a series of time spaced secondary pulses from which pulses for effecting a particular control function are selected by some appropriate switching means. Then in other pulse applications, for example, distant object locating systems, a transmitted pulse and a reflected pulse responsive thereto may be employed to provide certain information.

In apparatus, such as referred to above, the response of the pulse utilization means corresponding to a given sequence of pulses requires, of course, the presence of each pulse in the sequence. For various well-known reasons failures may occur occasionally in the circuit components providing the pulses and as a result the performance of the apparatus may be deleteriously affected.

By way of example, in electronic computing systems utilizing a sequence of pulses selectively arranged to represent a number, letter, machine instructions, or other information, a single pulse missing from a sequence of pulses may introduce serious errors into the information read out of the system. In the event such a failure occurs and the operator of the computer is unaware of the absence of a pulse, any errors resulting therefrom may not be noticed. It is important then that the operator of such apparatus be advised of any missing pulses.

As far as is known, no satisfactory means has been available heretofore for detecting the fortuitous absence of a pulse in a sequence of pulses, particular difficulty being experienced in detecting the absence of secondary pulses. Oscilloscopes have been tried for such purposes but they have been found to be unsatisfactory for the reason that constant observation of the fluorescent screen is necessary in order to insure detection of missing pulses. Furthermore, with relatively high pulse repetition rates, such as used in electronic computing apparatus, the occasional failure or omission of a pulse is not discernible on the screen.

2

It, therefore, would be desirable to provide test equipment for use with apparatus utilizing electrical pulses which would indicate the intermittent absence of a pulse.

Accordingly, it is a primary object of this invention to provide a missing pulse indicating system.

Another object is to provide a novel monitoring system for indicating the intermittent absence of a pulse in a sequence of pulses.

Still another object is to provide test apparatus for use with electrical pulse systems which indicates until reset the absence of a pulse.

A further object is to provide a novel monitoring system for indicating the number of pulse failures which occur in an electrical pulse system within a predetermined interval of time.

Further objects and advantages of this invention will become apparent from the following description taken in conjunction with the accompanying drawings in which.

Briefly, the invention comprises means whereby one pulse is effective to render a coincidence amplifier or gate valve sensitive to a check pulse until the pulse sought for appears to disable the gate valve, and indicating means responsive to check pulses passed by the gate valve, the sought for pulse normally occurring within the time interval between the first mentioned pulse and the check pulse.

Figure 1:
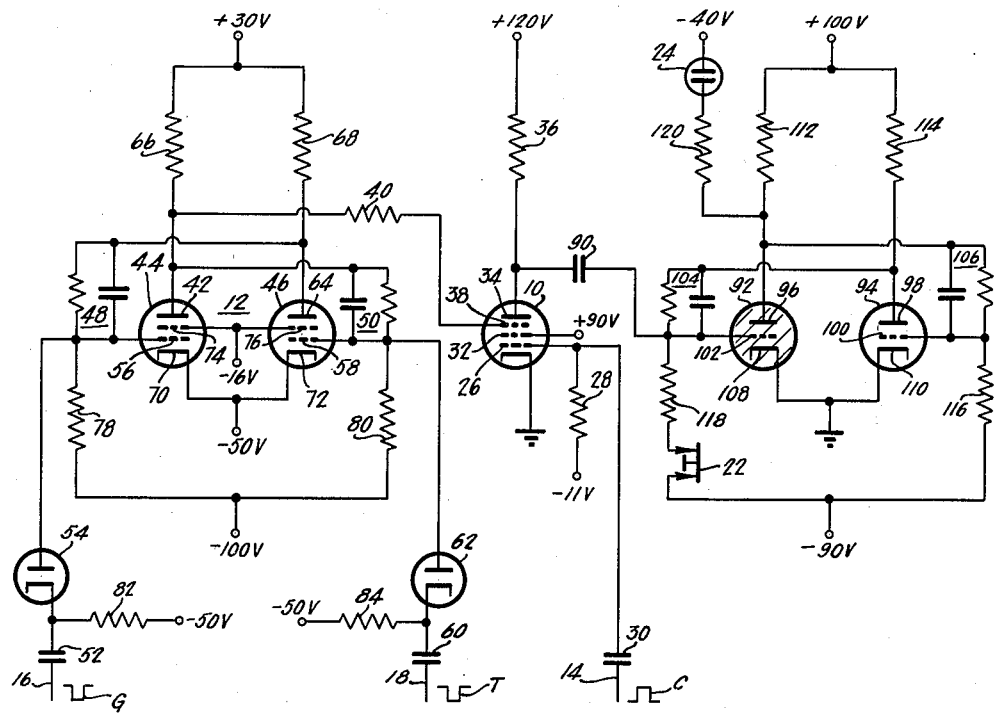
Figure 1 is a schematic diagram of one embodiment of the invention.

Referring now to Figure 1, the embodiment of the invention illustrated therein comprises, generally a coincidence amplifier or gating valve 10, a flip-flop trigger circuit 12 arranged to condition gate 10 to pass positive pulses appearing on a check pulse or control pulse line 14 in response to a negative pulse on gating pulse line 16 and to disable gate 10 in response to a negative pulse on the monitored pulse line 18, and a flip-flop indicating circuit 20 manually resettable to one state of stability by means of switch 22 so that a pulse passed by gate valve 10 may trigger flip-flop 20 to its other state of stability to give an indication on neon lamp 24 of the passage of a pulse by valve 10.

For a clearer understanding of the particular circuit arrangement shown in Figure 1, and for convenience in describing the circuit in detail, typical values for the potentials of the various power sources (not shown) are given in the drawing. Reference to these potentials is, therefore, intended to indicate appropriate power sources. It will be understood, of course, that the potential values are given by way of illustration only and that they may be varied depending upon the specific circuit conditions.

As indicated, gating valve 10 is a pentode having its cathode connected to ground or zero potential and its control grid 26 normally biased beyond cut-off by a negative 11 volt potential applied through grid resistor 28. Grid 26 is also coupled through capacitor 30 to control pulse line 14. Screen grid 32 and anode 34 are energized from suitable positive potentials, a plate load resistor 36 being in circuit with anode 34. Suppressor grid 38, which serves as the gating electrode, is conductively connected by way of current limiting resistor 40 to anode 42 of vacuum tube 44 in flip-flop 12. As may be seen tube 44 and tube 46 are tetrodes arranged in a conventional direct-coupled flip-flop circuit, the anode of one tube being connected to the grid of the other tube by means of the usual parallel resistor-capacitor coupling networks 48 and 50. As well known, this type of circuit has two conditions of stability, viz., one in which the current in one tube 44 is a maximum and the current in the other tube 46 is zero, and another condition in which the current in tube 46 is a maximum and that in tube 44 is zero. The circuit may be triggered from one state of stability to the other by the application of a negative pulse to the grid of the conducting tube.

To effect triggering of flip-flop 12 negative pulses on gating pulse line 16 are applied by way of coupling capacitor 52 and diode 54 to the grid 56 of tube 44 and negative pulses on the monitored pulse line 18 are applied to the control grid 58 of the tube 46 through capacitor 60 and diode 62. These diodes are included for the purpose of allowing flip-flop 12 to become free, that is each diode permits the pulse to be delivered to the grid of the flip-flop to initiate flipping action, but once this has started the potential on the grid will not be constrained to assume the potential of the pulse line and it may become more negative than the potential of this line. This results in faster flipping and more positive action.

During the conductive periods of each tube 44 and 46 its control grid is substantially at cathode potential. Consequently, to permit triggering of flip-flop 12 by negative going pulses on line 16 or 18 of reasonable magnitude, the cathodes of diodes 54 and 62 are returned through resistors 82 and 84, respectively, to the same potential as cathodes 70 and 72 in flip-flop 12, that is, to negative 50 volts.

Referring again to the suppressor grid 38 of gating valve 10, it will be noted that the potentials applied thereto are derived solely from the anode 42 of flip-flop tube 44. Accordingly, the circuit constants of flip-flop 12 and the operating potentials for the various electrodes of tubes 44 and 46 are chosen to provide the necessary gating and disabling voltages for gate valve 10. In the present instance, anodes 42 and 64 of the flip-flop tubes are connected to a positive 30 volt potential through their respective load resistors 66 and 68, and cathodes 70 and 72 are connected jointly to a negative volt source. The positive bias on screen grids 74 and 76 is obtained from a negative 16 volt potential. Control grids 56 and 58 are returned through resistors 78 and 80, respectively, to a negative 100 volt potential.

From the portion of the circuit arrangement described so far, it will be seen that a negative pulse G on gating pulse line 16 triggers flip-flop 12 to the condition in which tube 46 is conductive and tube 44 is non-conductive. The resulting rise in potential of the anode of tube 44, applied through resistor 40 to the grid 38 of gate valve 10, is effective to render the latter valve sensitive to positive pulses C appearing on control pulse line 14. Gate valve 10 is maintained in this sensitive condition by flip-flop 12 until such time that a negative pulse T occurs on the monitored pulse line 18 and triggers flip-flop 12 to its other state of stability in which tube 46 is non-conducting and tube 44 is conducting. During the time tube 44 is conductive the potential of its anode 42 places a sufficiently negative bias on suppressor grid 38 of gate valve 10 to disable this latter valve. It is evident that if a pulse T occurs on line 18 prior to the occurrence of a pulse C on line 14, no signal appears in the output of gate valve 10. In other words no output signal is produced at the anode of gate 10 if the pulses occur in the sequence G, T and C. However, the absence of a pulse T from this sequence results in the appearance of a negative pulse signal at the anode of valve 10.

To check for and indicate a missing pulse T, there is coupled to the anode 34 of gate valve 10, through capacitor 90, a flip-flop indicating circuit 20. This circuit will be recognized as another conventional direct-coupled flip-flop in which a pair of triodes 92 and 94 have their anodes 96 and 98 interconnected with grids 100 and 102 in the usual manner through parallel resistor-capacitor networks 104 and 106. Cathodes 108 and 110 may be connected to ground and anodes 96 and 98 energized from a positive potential of 100 volts applied through the respective load resistors 112 and 114. Control grid 100 of tube 94 connects to a negative 90 volt source through grid resistor 116 and control grid 102 of tube 92 is connected to coupling capacitor 90 and also to negative 90 volts through grid resistor 118 and switch 22. Momentary opening of switch 22 sets flip-flop 20 in the state of stability indicated in the drawing, that is, with the tube 92 conducting and tube 98 cut off. Neon lamp 24, and its current limiting resistor 120, are connected between anode 96 of tube 92 and a negative potential of 40 volts.

With flip-flop 20 in its normal state of equilibrium, the conduction of tube 92 places its anode 96 at a potential such that the voltage across neon lamp 24 is below that required to ignite the neon lamp. The application of a negative pulse, derived from the anode 34 of gate valve 10, to grid 102 of tube 92 triggers flip-flop 20 to its other stage of stability in which tube 92 is non-conductive and tube 94 is conductive. The potential of anode 96 of non-conducting tube 92 is now sufficiently positive to cause lamp 24 to glow and thereby indicate a pulse failure on the monitored pulse line 18. After an indication has been noted flip-flop 20 may be reset by switch 22 to its normal condition in preparation for the detection of a possible subsequent missing pulse on line 18.

Figure 2:
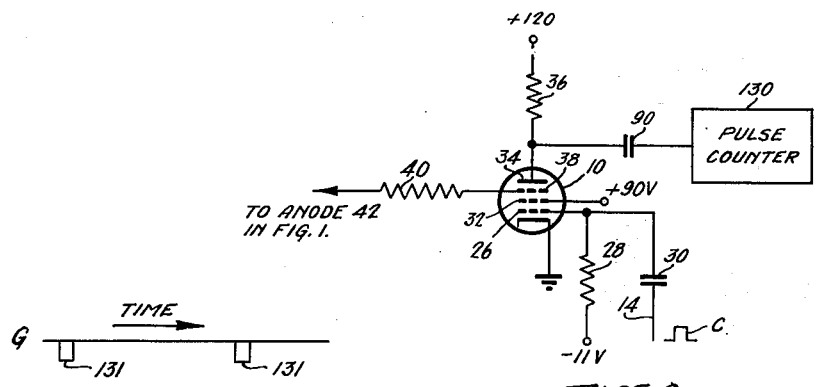
Figure 2 is a diagram illustrating an alternate embodiment of the invention.

Rather than just test for the occasional absence of a pulse on the monitored pulse line 18, it may be desired in some instances to test for and record a number of successive pulse failures so that the number of failures within a given time interval may be determined. For this purpose the indicating circuit 20 of Figure 1 may be replaced by any suitable pulse counting circuit as illustrated in Figure 2. Such counter circuits are well known in the art, consequently, the pulse counter in Figure 2 is represented by block 130. As the remainder of the circuit connections shown in Figure 1 are not modified for use with a pulse counter type of indicating circuit only a portion of the circuit is repeated in Figure 2.

Figure 3:
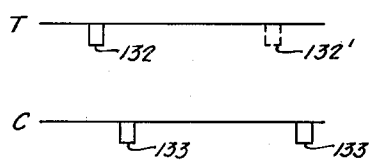
Figure 3 is a graph useful in explaining the invention.

The general manner in which the circuit arrangement shown in Figure 1 may be employed as a monitoring system for indicating the intermittent absence of pulses will be described with reference to Figure 3. In this latter figure there are illustrated three pulse lines G, T and C on which normally appear pulses 131, 132 and 133, respectively, in this sequence. These pulses may or may not recur periodically but when they do occur they are in the sequence shown. Let it be assumed, for sake of illustration, that it is desired to check for and indicate the absence of a pulse on line T, as indicated by the dashed pulse line 132'. In this instance gating pulse line 16, monitored pulse line 18 and check pulse line 14 of Figure 1 are connected, respectively, to pulse lines G, T and C. Preferably each connection is made through well-known coupling means (not shown), such as a cathode follower isolating amplifier, which prevents loading of the pulse line by the test apparatus. Also, for negative pulses 133 on line C, a conventional phase inverter circuit (not shown) may be included in line 14 to provide positive going impulses at the control grid 26 of gate valve 10. This circuit may be arranged to provide the desired loading isolation.

From the foregoing detailed description of Figure 1, it is believed evident that with continual recurrence of pulses on lines G, T and C no indication will be given by neon lamp 24. However, in the event of the absence of a pulse 132, the pulse sequence indicating flip-flop circuit 20 is set in a condition to effect ignition of lamp 24 and this circuit remains in this state until manually reset by switch 22, thereby providing a readily observed indication of a pulse failure on line T.

It will be obvious to those skilled in the art that many modifications and variations are possible without departing materially from the spirit of the invention.

What is claimed is:

1. In combination, first, second and third signal input lines adapted to respectively receive external excitation, an indicating device, a signal transfer link operatively connected between said third signal line and said indicating device, and apparatus conditioning said signal transfer link for passage of signals in response to excitation of said first signal line and disabling said signal transfer link in response to excitation of said second signal line.

2. In combination, first, second and third signal input lines adapted to respectively receive external excitation, an indicating device, a signal transfer link operatively connected between said third signal line and said indicating device, and apparatus comprising electrode structures having a plurality of elements conditioning said signal transfer link for passage of signals in response to excitation of said first signal line and disabling said signal transfer link in response to excitation of said second signal line.

3. In combination, first, second and third signal input lines adapted to respectively receive external excitation, an indicating device, a signal gating valve operatively connected between said third signal line and said indicating device, and apparatus conditioning said signal gating valve for passage of signals in response to excitation of said first signal line and disabling said signal gating valve in response to excitation of said second signal line.

4. In combination, first, second and third signal input lines adapted to respectively receive external excitation, an indicating device, a signal transfer link operatively connected between said third signal line and said indicating device, and a trigger circuit conditioning said signal transfer link for passage of signals in response to excitation of said first signal line and disabling said signal transfer link in response to excitation of said second signal line.

5. In combination, first, second and third signal input lines adapted to respectively receive external excitation, an indicating device, a signal gating valve operatively connected between said third signal line and said indicating device, and a trigger circuit conditioning said signal gating valve for passage of signals in response to excitation of said first signal line and disabling said signal gating valve for passage of signals in response to excitation of said second signal line.

6. In combination, first, second and third signal input lines adapted to respectively receive external excitation, an indicating device, a signal transfer link comprising an electrode structure including an output electrode and a plurality of control electrodes, an operative connection between the output electrode of said signal transfer link and said indicating device, an operative connection between one of the control electrodes of said transfer link and said third signal line, and a multistable apparatus having a pair of input leads respectively connected with said first and second signal lines and an output lead connected to another one of the control electrodes of said signal transfer link, said multistable apparatus conditioning said signal transfer link for passage of signals after excitation over said first signal line and disabling said signal transfer link after excitation over said second signal line.

7. In combination, first, second and third signal input lines adapted to respectively receive external excitation, an indicating device, a signal gating valve comprising an electrode structure including an output electrode and a plurality of control electrodes, an operative connection between the output electrode of said signal gating valve and said indicating device, an operative connection between one of the control electrodes of said gating valve and said third signal line, and a trigger circuit having a pair of input leads respectively connected with said first and second signal lines and an output lead connected to another one of the control electrodes of said signal gating valve, said trigger circuit conditioning said signal gating valve for passage of signals after excitation over said first signal line and disabling said signal gating valve after excitation over said second signal line.

8. In combination, first, second and third signal input lines adapted to respectively receive external excitation, an indicating device, a signal gating valve comprising an electrode structure including an output electrode and a plurality of control electrodes, an operative connection between the output electrode of said signal gating valve and said indicating device, an operative connection between one of the control electrodes of said gating valve and said third signal line, and a trigger circuit comprising a pair of electrode structures including a plurality of control electrodes respectively connected with said first and second signal lines and an output electrode connected to another one of the control electrodes of said signal gating valve, said trigger circuit conditioning said signal gating valve for passage of signals after excitation over said first signal line and disabling said signal gating valve after excitation over said second signal line.

JAMES ROBERT WEINER.

REFERENCES CITED

The following references are of record in the file of this patent:

UNITED STATES PATENTS

| Number | Name | Date |
|---|---|---|
| 2,410,669 | Lynn | Nov. 5, 1946 |
| 2,462,655 | McHenry | Feb. 22, 1949 |
| 2,497,936 | Finch | Feb. 21, 1950 |